United States Patent [19]
Sugitani

[11] Patent Number: 6,078,851
[45] Date of Patent: Jun. 20, 2000

[54] APPARATUS FOR DISCRIMINATING ANOMALY OF DETECTING DEVICE

[75] Inventor: Nobuyoshi Sugitani, Susono, Japan

[73] Assignee: Toyota Jidosha Kabushiki Kaisha, Toyota, Japan

[21] Appl. No.: 09/019,547

[22] Filed: Feb. 6, 1998

[30] Foreign Application Priority Data

Mar. 11, 1997 [JP] Japan .................................. 9-056225

[51] Int. Cl.⁷ .......................... B62D 6/00; B62D 113/00; G01B 21/22; G01D 21/00
[52] U.S. Cl. ............................................................. 701/34
[58] Field of Search ........................................ 701/29, 34

[56] References Cited

U.S. PATENT DOCUMENTS

| | | | |
|---|---|---|---|
| 4,996,657 | 2/1991 | Shiraishi et al. | 702/151 |
| 5,014,801 | 5/1991 | Hirose | 180/412 |
| 5,029,466 | 7/1991 | Nishihara et al. | 73/118.1 |
| 5,065,325 | 11/1991 | Takahashi | 701/43 |
| 5,343,393 | 8/1994 | Hirano et al. | 701/41 |

FOREIGN PATENT DOCUMENTS 2-195224  8/1990  Japan .
3-61170   3/1991  Japan .

*Primary Examiner*—Michael J. Zanelli
*Attorney, Agent, or Firm*—Oliff & Berridge, PLC

[57] ABSTRACT

An anomaly discriminating apparatus of the present invention comprises: first and second detecting devices for detecting state values of one event; and a processing device storing occurrence probability distribution group data which is a set of occurrence probability distributions of state values probably detected by the second detecting device against an arbitrary state value detected by the first detecting device, the processing device reading an occurrence probability on an occurrence probability distribution determined by a first state value detected by the first detecting device and a second state value detected by the second detecting device, the processing device determining whether at least either one of the first and second detecting devices is anomalous, based on a plurality of occurrence probabilities read out at different timings.

9 Claims, 1 Drawing Sheet

APPARATUS FOR DISCRIMINATING ANOMALY OF DETECTING DEVICE

BACKGROUND OF THE INVENTION

1. Field of the Invention

The present invention relates to an apparatus for discriminating an anomaly of detecting device and, more particularly, to an anomaly discriminating apparatus effective in detecting state values of one event by two detecting devices.

2. Related Background Art

The technology for detecting state values of one event by two detecting devices and for comparing output values from the two detecting devices to discriminate an anomaly of either detecting device is disclosed, for example, in "Steering angle detecting apparatus for vehicle," Japanese Laid-open Patent Application No. Hei 2-195224. In this conventional technology, a steering angle in a vehicle is detected by two types of steering angle detecting devices based on different principles, and it is determined that either one of the detecting devices is anomalous when a difference between two measured values exceeds a certain value. In general, the steering angle information is used as one of control conditions in an assist control system of power steering, an anti-lock braking system of wheels, or the like. Accordingly, such discrimination of anomaly of detecting device is significant in order to enhance reliability of these control systems.

According to this conventional technology, however, discrimination of anomaly is made by whether the difference between output values from the two steering angle detecting devices exceeds the prescribed value (threshold value) preliminarily set, which imposes the limitation on the accuracy of discrimination of anomaly. Specifically, there will appear more or less variations in outputs of the steering angle detecting devices even if the steering angle detecting devices are normal; if the prescribed value is set to a rather large value in order to avoid erroneous discrimination of anomaly, misjudgment of normal will occur frequently despite anomaly; inversely, if the prescribed value is set to a rather small value in order to avoid detection failure in discrimination of anomaly, misjudgment of anomaly will occur frequently despite normal.

SUMMARY OF THE INVENTION

An anomaly discriminating apparatus of the present invention has been accomplished in view of the above problem, and the apparatus comprises first and second detecting means for detecting state values of one event; and processing means storing occurrence probability distribution group data which is a set of occurrence probability distributions of state values probably detected by the second detecting means against an arbitrary state value detected by the first detecting means, the processing means reading an occurrence probability on an occurrence probability distribution determined by a first state value detected by the first detecting means and a second state value detected by the second detecting means, the processing means determining whether at least either one of the first and second detecting means is anomalous, based on a plurality of occurrence probabilities read out at different timings.

The processing means is desirably arranged so that a probability threshold value T1 is set for each of the occurrence probability distribution data stored, the processing means calculates a product $\beta$ of values $\alpha_i$ ($i=1, \ldots, n$), each being a ratio of either of the n occurrence probabilities read at the different timings to a corresponding one of the probability threshold values T1 of the respective distributions, and the processing means determines that at least either one of the first and second detecting means is anomalous when the product $\beta$ is smaller than a predetermined value.

Further, the processing means is desirably arranged so that second occurrence probability distribution group data, which is a set of occurrence probability distributions of state values probably detected by the first detecting means against an arbitrary state value detected by the second detecting means, is further stored and so that a probability threshold value T2 is set for each occurrence probability distribution in the second occurrence probability distribution group data stored, the processing means reads an occurrence probability on an occurrence probability distribution in the second occurrence probability distribution group determined by a first state value detected by the first detecting means and a second state value detected by the second detecting means, the processing means calculates a product $\delta$ of values $\gamma_i$ ($i=1, \ldots, m$), each being a ratio of either of m occurrence probabilities read at different timings to a corresponding one of the probability threshold values T2 of the respective distributions, and the processing means determines which of the first and second detecting means is anomalous from magnitudes of the product $\beta$ and the product $\gamma$ when at least either one of the first and second detecting means is anomalous.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
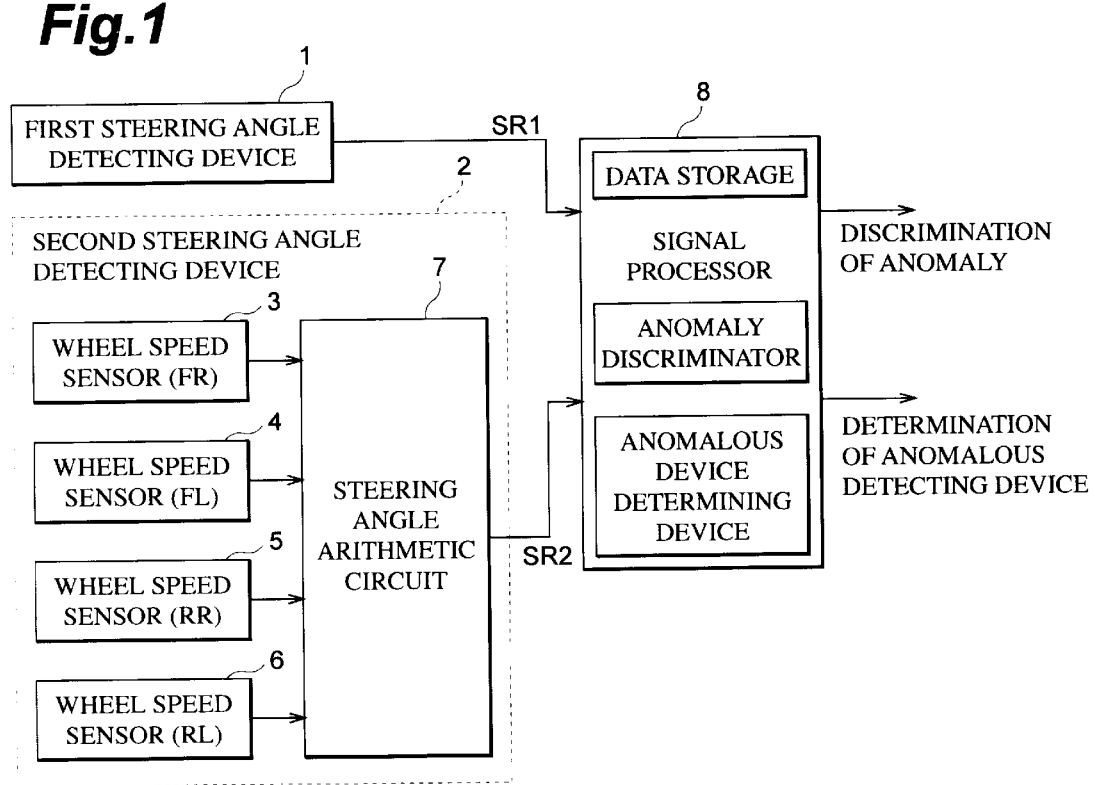
FIG. 1 is a block diagram to show an embodiment of the present invention.

FIG. 1 is a block diagram to show an embodiment where the anomaly discriminating apparatus of the present invention is applied to a steering angle detecting apparatus of vehicle. The steering angle detecting methods of vehicle conventionally known include a method for directly detecting a steering angle by placing a rotation angle sensor such as a potentiometer on a steering system of vehicle and a method for detecting the steering angle from a difference between wheel speeds. In the present embodiment, a steering angle detecting device according to the former method is called first steering angle detecting device 1 and a steering angle detecting device according to the latter method second steering angle detecting device 2.

The first steering angle detecting device 1 is a rotation angle sensor using the potentiometer, in which a voltage value according to a steering angle is obtained from the potentiometer and in which this voltage value is converted to data indicating the steering angle value SR1, which is outputted.

The second steering angle detecting device 2 has wheel speed sensors 3 to 6, respectively provided for the four wheels front and rear and left and right of vehicle, and a steering angle arithmetic circuit 7 for calculating the steering angle, based on outputs from the wheel speed sensors 3 to 6.

The wheel speed sensors 3 to 6 are sensors used for the anti-lock brake system or the like, and an example of generalized sensors is a magnetic rotational speed sensor utilizing the induced electromotive force. The rotational speed sensor of this type has a magnetic substance rotor, attached to a wheel and provided with many teeth on its circumference, and a coil and a permanent magnet located opposite to each other to the periphery of the magnetic substance rotor. When the magnetic substance rotor rotates with rotation of the wheel, the magnetic flux interlinked with the coil changes to generate an alternating voltage of a frequency proportional to the wheel speed in the coil. This alternating voltage is converted to pulses and the pulses are outputted. The wheel speed sensor 3 is placed to the front right wheel (FR), the wheel speed sensor 4 to the front left wheel (FL), the wheel speed sensor 5 to the rear right wheel (RR), and the wheel speed sensor 6 to the rear left wheel (RL), respectively.

The steering angle arithmetic circuit 7 calculates the steering angle from a difference between speeds of the left and right wheels being idler wheels. For example, in the case of a front engine rear drive vehicle, i.e., an FR vehicle, where the front left and right wheels are the idler wheels, the steering angle arithmetic circuit 7 calculates the steering angle, exclusively using pulse output signals from the wheel speed sensors 3 and 4.

The steering angle arithmetic circuit 7 first obtains the wheel speeds $V_{WL}$ and $V_{WR}$ of the front left and right wheels, based on the pulse signals outputted from the wheel speed sensors 4 and 3, respectively. The speeds can be obtained by counting pulses within a predetermined time.

Next, a steering angle value SR2 is calculated using the wheel speeds $V_{WR}$ and $V_{WL}$. Equation (1) below is to estimate the steering angle of vehicle from a geometrical model upon cornering of vehicle, and the steering angle value SR2 can be obtained by substituting the wheel speeds $V_{WR}$ and $V_{WL}$ as variables into this equation.

$$SR2 = (2 \cdot Ks \cdot L/W)(V_{WL} - V_{WR})/(V_{WL} + V_{WR}) \quad (1)$$

In this equation, KS is a steering gear ratio, L the wheel base, and W the tread. The steering gear ratio is one obtained by dividing a rotation angle of the steering wheel by a turning angle of tires.

The steering angle arithmetic circuit 7 always calculates the steering angle value SR2, obtained in this way, in predetermined calculation cycles.

Signal processing circuit 8 compares the steering angle value SR1 outputted from the first steering angle detecting device 1 with the steering angle value SR2 outputted from the second steering angle detecting device 2 and discriminates an anomaly of the first steering angle detecting device 1 or the second steering angle detecting device 2.

In the signal processing circuit 8, a data storing unit stores data of first occurrence probability distribution group, which is a set of SR1-based occurrence probability distributions, each indicating occurrence probabilities of output steering angle values SR2 of the second steering angle detecting device 2 against an arbitrary output steering angle SR1 of the first steering angle detecting device 1, and data of second occurrence probability distribution group, which is a set of SR2-based occurrence probability distributions, each indicating occurrence probabilities of output steering angle values SR1 of the first steering angle detecting device 1 against an arbitrary output steering angle SR2 of the second steering angle detecting device 2.

Figure 2:
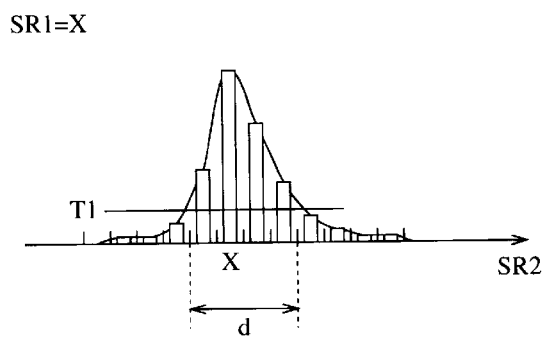
FIG. 2 is a graph to show an occurrence probability distribution.

FIG. 2 is a graph to show occurrence probabilities of probable output steering angle values SR2 of the second steering angle detecting device 2 where the output steering angle value SR1 of the first steering angle detecting device 1 is the value X. Since the both first steering angle detecting device 1 and second steering angle detecting device 2 detect state values (steering angle values) for a common event of steering angle, the highest probability appears at the same steering angle value. Accordingly, when the steering angle value SR1 is the value X, the probability of the steering angle value SR2 being X is highest. The probable steering angle values SR2 are dispersed on either side of X because of variations in the output values based on the detection accuracy of the steering angle detecting devices 1 and 2. FIG. 2 shows the occurrence probability distribution.

A lot of such occurrence probability distributions of steering angle value SR2 are prepared with changing values of steering angle value SR1 within a probable range, and the whole is stored as a first occurrence probability distribution group. Each occurrence probability distribution data in this first probability distribution group may be one theoretically obtained based on the output variations or the like of the first steering angle detecting device 1 and second steering angle detecting device 2, or one obtained by sampling data by experiments and combining it.

A probability threshold value T1 is set for each of the individual distributions against each steering angle value SR1 in the first occurrence probability distribution group. Set values of these probability threshold values T1 are properly determined according to the concept of the anomaly discriminating process described hereinafter. Mutually different values may be set for the respective distributions for every steering angle value SR1, or an identical value may be set for the all distributions.

In the similar manner to this first occurrence probability distribution group, a lot of occurrence probability distributions of probable output steering angle values SR1 of the first steering angle detecting device 1 when the output steering angle value SR2 of the second steering angle detecting device 2 is the value Y are obtained for every value of Y, and they are stored as a second occurrence probability distribution group. A proper probability threshold value T2 is also set for each occurrence probability distribution in this second occurrence probability distribution group. The all probability threshold values T2 may be set to an identical value, as was the case the probability threshold values T1.

Next, the anomaly discriminating process in the signal processing circuit 8 will be described. Let us suppose that the steering angle value SR1 detected at a certain time T(1) by the first steering angle detecting device 1 was X(1) and that the steering angle value SR2 detected thereat by the second steering angle detecting device 2 was Y(1). The signal processing circuit 8 selects an occurrence probability distribution for X(1) of the detected steering angle value SR1 out of the first occurrence probability distribution group data and reads an occurrence probability A(1) for Y(1) of the detected steering angle value SR2 out of the distribution. Then the circuit calculates a ratio of the occurrence probability A(1) to the probability threshold value T1 in that probability distribution, α(1)=A(1)/T1. When the value of Y(1) is within the range d in FIG. 2, the value of α(1) should be in the following range.

$$\alpha(1) \geq 1.$$

When the value of Y(1) is out of the range d, the value of α(1) should be in the following range.

$$0 \leq \alpha(1) < 1$$

Similarly, based on values X(2) and Y(2) of respective steering angle values SR1 and SR2 detected at time T(2), the circuit reads out of the first occurrence probability distribution group data an occurrence probability A(2) where the detected steering angle value SR2 is Y(2) when the detected steering angle SR1 is the value X(2), and calculates a ratio of the probability distribution to the associated probability threshold value T1, α(2)=A(2)T1. It is noted that the value of probability threshold T1 at this point is not always equal to the value of probability threshold T1 used at the previous time, i.e., at the time T(1), as described above.

Values of α(i) at respective times T(i) are continuously obtained in fixed process cycles in the manner as described above.

The signal processing circuit 8 multiplies the values α(i), thus calculated, a predetermined number p times to obtain a value β as shown in the following equation.

$$\beta = \alpha(1) \cdot \alpha(2) \cdot \alpha(3) \cdot \ldots \cdot \alpha(p) \quad (2)$$

When a value of occurrence probability A(i) is larger than the probability threshold value T1, α should be greater than 1. Therefore, if this state continues the product will increase every multiplication. Conversely, when a value of occurrence probability A(i) is smaller than the probability threshold value T1, α should be smaller than 1. Then the product β will decrease.

Then the product β is compared with a threshold value Z. If the following condition is satisfied the processing circuit will determine that an anomaly occurs in either one of the first steering angle detecting device 1 or the second steering angle detecting device 2.

$$\beta < Z \quad (3)$$

Namely, if either the first steering angle detecting device 1 or the second steering angle detecting device 2 is anomalous a state in which values of occurrence probability A(i) are smaller than the probability threshold value T1, i.e., a state in which values of α(i) are smaller than 1, will continue, and the product β will thus approach zero. Therefore, the anomaly can be discriminated by above Eq. (3). Even if an occurrence probability A(i) smaller than the probability threshold value T1 appears singly in continuation of occurrence probabilities A(i) larger than the probability threshold value T1, the signal processing circuit will not make a judgment of anomaly as long as the product is not smaller than the threshold value Z. Therefore, erroneous discrimination of anomaly will not occur, even if the two detected steering angle values SR1 and SR2 are shifted greatly from each other in a flash from some reason (noise), though the first steering angle detecting device 1 and second steering angle detecting device 2 both are normal.

Levels of variations in the difference between output steering angle values of the two steering angle detecting devices differ depending upon magnitudes of steering angle values, but this embodiment permits the probability threshold values T1 to be determined according to the steering angle values, thus decreasing chances of erroneous discrimination of anomaly.

The probability threshold values T1, the t hreshold value Z, the number p of multiplication of α values, etc. used in this discrimination of anomaly are properly set depending upon the performance and the detecting object of the detecting devices.

When it is judged by the above-stated anomalous discriminating process th at either the first steering angle detecting device 1 or the second steering angle detecting device 2 is anomalous, the signal processing circuit carries out determination of anomalous device as to which of the first steering angle detecting device 1 and the second steering angle detecting device 2 is anomalous. In this determination of anomalous device, the processing circuit selects an occurrence probability distribution corresponding to the detected steering angle value SR2 from the second occurrence probability distribution group, based on the detected steering angle values SR1 and SR2, and reads an occurrence probability B of the detected steering angle value SR1 at that time. This reading is carried out in tandem with reading of the occurrence probability A from the first occurrence probability distribution group in the above-stated anomalous discriminating process.

Let us suppose that the detected steering angle value SR1 of the first steering angle detecting device 1 at time T(i) was X(i) and that the detected steering angle value SR2 of the second steering angle detecting device 2 was Y(i). The signal processing circuit 8 selects an occurrence probability distribution corresponding to X(i) from the first occurrence probability distribution group data and reads an occurrence probability A(i) based on Y(i). At the same time as it, the signal processing circuit 8 selects an occurrence probability distribution corresponding to Y(i) from the second occurrence probability distribution group data and reads an occurrence probability B(i) for X(i) of the detected steering angle SR1. Then the signal processing circuit calculates a ratio of this occurrence probability B(i) to the probability threshold value T2 in that probability distribution, γ(i)=B(i)/T2.

The signal processing circuit 8 calculates a value by multiplying the values γ(i), calculated in this way, the predetermined number p times as shown in the following equation.

$$\delta = \gamma(1) \cdot \gamma(2) \cdot \gamma(3) \cdot \ldots \cdot \gamma(p) \quad (4)$$

When a value of occurrence probability B(i) read out of the second occurrence probability distribution group is larger than the probability threshold value T2, γ should be greater than 1. If this state continues the product δ will increase every multiplication. Conversely, if a value of occurrence probability B(i) read out of the second occurrence probability distribution group is smaller than the probability threshold value T2, γ should be smaller than 1 and the product δ will decrease.

Then δ obtained in this way is compared with β obtained in the anomaly discriminating process. When δ is considerably smaller than β, the first steering angle detecting device 1 should be anomalous with a high probability. Conversely, when δ is considerably smaller than β, the second steering angle detecting device 2 should be anomalous with a high probability. Determination of anomalous device is carried out by making use of this result.

Although the present embodiment is arranged to detect the anomaly of detecting devices for detecting the steering angle in the vehicle, the objects detected by the detecting devices are not limited to it.

As described above, the anomaly discriminating apparatus of the present invention is arranged so that when the apparatus is provided with two detecting devices for detecting state values of one event, an occurrence probability of a detected value by one detecting device against the detected value by the other detecting device is obtained plural times and discrimination of anomaly is carried out based on the thus accumulated results, whereby the apparatus can perform the discrimination of anomaly at high accuracy. Namely, when either one of the detecting devices is anomalous and even if the degree of anomaly is low, discrimination of anomaly can be done well because of the accumulating process; when the detecting devices are normal and even if a difference instantaneously appears between the two output values because of noise or the like, it will not be erroneously discriminated as an anomaly.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An anomaly discriminating apparatus comprising:
   first and second detecting means for detecting state values of one event; and
   processing means storing occurrence probability distribution group data which is a set of occurrence probability distributions of state values probably detected by said second detecting means against an arbitrary state value detected by said first detecting means, said processing means reading an occurrence probability on a said occurrence probability distribution determined by a first state value detected by said first detecting means and a second state value detected by said second detecting means, said processing means determining whether at least either one of said first and second detecting means is anomalous, based on a plurality of said occurrence probabilities read out at different timings.

2. An anomaly discriminating apparatus according to claim 1, wherein said processing means is arranged so that a probability threshold value T1 is set for each of said occurrence probability distribution data stored, said processing means calculates a product $\beta$ of values $\alpha i$ (i=1, . . . , n), each being a ratio of either of the n occurrence probabilities read at said different timings to a corresponding one of said probability threshold values T1 of the respective distributions, and said processing means determines that at least either one of said first and second detecting means is anomalous when the product $\beta$ is smaller than a predetermined value.

3. An anomaly discriminating apparatus according to claim 2, wherein said first detecting means and said second detecting means are sensors constructed in mutually different structures.

4. An anomaly discriminating apparatus according to claim 3, wherein said first and second detecting means are steering angle sensors mounted on a vehicle.

5. An anomaly discriminating apparatus according to claim 4, wherein either one of said first detecting means and said second detecting means being said steering angle sensors of the vehicle is a rotation angle sensor mounted in a steering system of said vehicle and wherein the other detecting means is steering angle calculating means for calculating a steering angle from wheel speeds of said vehicle.

6. An anomaly discriminating apparatus according to claim 2, wherein said processing means is arranged so that second occurrence probability distribution group data, which is a set of occurrence probability distributions of state values probably detected by said first detecting means against an arbitrary state value detected by said second detecting means, is further stored and so that a probability threshold value T2 is set for each occurrence probability distribution in said second occurrence probability distribution group data stored, said processing means reads an occurrence probability on an occurrence probability distribution in said second occurrence probability distribution group determined by a first state value detected by said first detecting means and a second state value detected by said second detecting means, said processing means calculates a product $\delta$ of values $\gamma i$ (i=1, . . . , m), each being a ratio of either of m said occurrence probabilities read at different timings to a corresponding one of said probability threshold values T2 of the respective distributions, and said processing means determines which of the first and second detecting means is anomalous from magnitudes of said product $\beta$ and said product $\delta$ when at least either one of said first and second detecting means is anomalous.

7. An anomaly discriminating apparatus according to claim 6, wherein said first detecting means and said second detecting means are sensors constructed in mutually different structures.

8. An anomaly discriminating apparatus according to claim 7, wherein said first and second detecting means are steering angle sensors mounted on a vehicle.

9. An anomaly discriminating apparatus according to claim 8, wherein either one of said first detecting means and said second detecting means being said steering angle sensors of the vehicle is a rotation angle sensor mounted in a steering system of said vehicle and wherein the other detecting means is steering angle calculating means for calculating a steering angle from wheel speeds of said vehicle.

* * * * *